(12) United States Patent
Yuzer et al.

(10) Patent No.: US 10,377,100 B2
(45) Date of Patent: Aug. 13, 2019

(54) CLEANING ROBOT FOR TIRE CURING MOLD

(71) Applicant: Lang Yuzer Otomotiv Yan Sanayi Ve Ticaret Anonim Sirketi, Cerkezkoy/Tekirdag (TR)

(72) Inventors: Ismet Yuzer, Cerkezkoy/Tekirdag (TR); Mustafa Hami Yucel, Cerkezkoy/Tekirdag (TR); Okan Denizli, Cerkezkoy/Tekirdag (TR); Görkem Anil Al, Cerkezkoy/Tekirdag (TR); Latif Orbay, Cerkezkoy/Tekirdag (TR)

(73) Assignee: LANG YUZER OTOMOTIV YAN SANAYI VE TICARET ANONIM SIRKETI, Cerkezkoy/Tekirdag (TR)

(*) Notice: Subject to any disclaimer, the term of this patent is extended or adjusted under 35 U.S.C. 154(b) by 165 days.

(21) Appl. No.: 15/539,577

(22) PCT Filed: Dec. 25, 2015

(86) PCT No.: PCT/TR2015/000389
§ 371 (c)(1),
(2) Date: Jun. 23, 2017

(87) PCT Pub. No.: WO2016/105307
PCT Pub. Date: Jun. 30, 2016

(65) Prior Publication Data
US 2017/0348931 A1 Dec. 7, 2017

(30) Foreign Application Priority Data

Dec. 25, 2014 (TR) .................................. 2014/15813

(51) Int. Cl.
*B29D 30/06* (2006.01)
*B08B 9/00* (2006.01)
(Continued)

(52) U.S. Cl.
CPC ............ *B29D 30/0662* (2013.01); *B08B 9/00* (2013.01); *B25J 9/047* (2013.01); *B25J 11/0085* (2013.01);
(Continued)

(58) Field of Classification Search
None
See application file for complete search history.

(56) References Cited

U.S. PATENT DOCUMENTS 2,479,299 A * 8/1949 Biggs ...................... B29C 33/72
312/1
3,905,155 A * 9/1975 Smith ....................... B24C 3/00
451/38
(Continued)

FOREIGN PATENT DOCUMENTS

DE 198 30 397 1/2000
DE 199 33 195 1/2001
(Continued)

OTHER PUBLICATIONS

Kuri Gunter, Dry ice cleaning equipment for a vulcanizing mold, DE19830397, Espacenet translation, 2000 (Year: 2000).*
(Continued)

*Primary Examiner* — Jason Y Ko
*Assistant Examiner* — Cristi J Tate-Sims
(74) *Attorney, Agent, or Firm* — Gokalp Bayramoglu

(57) ABSTRACT

Invention is a cleaning robot for cleaning the inner surfaces (5) of the half mold (4) of tire curing molds comprising a basket (10) wherein a lifting arm (50) placed in a manner pivotal on a proximal end (52), the lifting arm (50) pivoted on a distal end (54) of a support arm (70). The cleaning robot fits completely into the basket (10) when the positioned as close and comprising a movable head (80) having a nozzle (82) coupled in a manner to establish fluid communication
(Continued)

to the dry ice inlet (84) and located at the distal end (76) of the support arm (70) and a free end which is configured movably closer to the inner surface (5) such as at a vicinity of the inner surface (5) along the contour of its when the positioned as open.

9 Claims, 3 Drawing Sheets

(51) Int. Cl.
    *B25J 11/00*     (2006.01)
    *B29C 33/72*     (2006.01)
    *B25J 9/04*     (2006.01)
    *B25J 18/02*     (2006.01)

(52) U.S. Cl.
    CPC ............ *B25J 18/025* (2013.01); *B29C 33/72* (2013.01); *B29D 2030/0663* (2013.01)

(56) References Cited

U.S. PATENT DOCUMENTS

| | | | |
|---|---|---|---|
| 6,368,417 B1 * | 4/2002 | Weber | B29C 33/72 134/172 |
| 6,369,353 B1 * | 4/2002 | Soska | B08B 7/0042 219/121.68 |
| 6,454,857 B1 * | 9/2002 | Glasner | B29C 33/72 118/306 |

FOREIGN PATENT DOCUMENTS

| | | | |
|---|---|---|---|
| EP | 2 695 728 | 2/2014 | |
| WO | WO-9807548 A1 * | 2/1998 | ............ B24C 1/003 |

OTHER PUBLICATIONS

International Search Report from PCT/TR2015/000389 dated May 31, 2016.

* cited by examiner

CLEANING ROBOT FOR TIRE CURING MOLD

RELATED APPLICATIONS

This application is a 35 U.S.C. § 371 national phase application of PCT/TR2015/000389 (WO 2016/105307), filed on Dec. 25, 2015, entitled "Cleaning Robot for Tire Curing Mold", which application claims priority to Turkish Application No. 2014/15813, filed Dec. 25, 2014, which is incorporated herein by reference in its entirety.

TECHNICAL FIELD

The invention relates to a robot mechanism for cleaning molds of tire curing used in the production of vehicle tires using dry ice.

TECHNICAL BACKGROUND

There are two-part curing molds having one top part of this mold is movable vertically so as to open and one bottom part that are placed on each other and used for the manufacture of vehicle tires. In these molds, vulcanization process (curing) takes place and generally removing of the rubber residuals by cleaning of the threads on tires formed with mold recesses on the top mold part or on the other surfaces and on the bottom mold, and on the side walls.

Dry ice blasting is known for the non-destructive cleaning from a nozzle towards into inner volume of the cleaning mold. This process causes a noise over the limits of business safety for the operator. International patent publication numbered with WO9807548A1, discloses an apparatus and a method using frozen gas pellets by the help of apparatus controlled robotically in the cleaning of tire molds. Accordingly, hot mold get into a cabinet insulated as soundproof and wherein the nozzles at the end part of robot arm are directed to the frozen gas pellets into cleaning mold surface The arm is rotated on the turntable to clean the entire mold surface. The mold is removed from the cabinet after completion of the process. The preferred frozen gas is $CO_2$ in order to access micro-scale spaces and having none-abrasive effects on the molds Recommended embodiment requires that transport equipment for the transferring the molds into a soundproof cabinet. Furthermore, displacement of the molds dislodging of the molds from the seedbeds the bearings that is to be cleaned. For both case increases the production costs.

International patent application numbered as WO0002709A1 as to disclose similar equipment. Accordingly, there is a dry ice nozzle at the free end of a support arm providing the dry ice blasting into the mold, is located in a rotatable manner on the longitudinal axis of the support arm. Dry ice nozzle connected with a supply hose that is transporting from dry ice machine. A regulation mechanism attached to the support arm regulates the suitable angles according to rotational axis of the dry ice nozzle.

US patent application numbered with WO9807548A1 discloses a vulcanization mold cleaning assembly having manipulator carrying this assembly. The cleaning equipment comprising an isolation hood placed at the boom of the conveyor and by using this part replace the position of the isolation hood transversely upwards and horizontally and a spray nozzle inside of the isolation hood.

BRIEF DESCRIPTION OF THE INVENTION

The purpose of the invention increases the cleaning efficiency of the tire curing mold with a transferable cleaning robot inlying in to a basket.

Invention to achieve the above objects, a cleaning robot for cleaning the inner surfaces of the curing mold halves, half molds of tire curing molds comprising a basket wherein a lifting arm placed in a manner pivotal on a proximal end, the lifting arm pivoted on a distal end of a support arm. The cleaning robot fits completely into the basket when the positioned as closed and comprising a movable head having a nozzle coupled in a manner to establish fluid communication to the dry ice inlet and located at the distal end of the support arm and a free end which is configured movably closer to the inner surface such as at a vicinity of the inner surface along the contour of its when the positioned as opened. Owing to the robot as subject matter of the invention, preferably articulated from 6 points-degree preferably with serial kinematics provides effective cleaning of the molds in the range 13'-22.5' of the tire rims.

A preferred embodiment of the invention, wherein horizontal rotatable joint pivoted to the support arm providing freedom of movement horizontally at the rotation axis of the movable head is orthogonal to the elongation axis of the support arm. On account of horizontal rotatable joint, movable head provides application of dry ice blasting multiple times in to desired area without turning in the highest degree as completely turning once by moving to the right and to the left in the radial direction inside the curing mold halves.

In a preferred embodiment of the invention characterized in that the orthogonal rotation axis of the horizontal rotatable joint is between substantially −20 and +20 degrees. In another preferred embodiment characterized in that the orthogonal rotation axis of the horizontal rotatable joint is between −15 and +15 degrees. Another embodiment of the invention characterized in that the orthogonal rotation axis of the horizontal rotatable joint is having acute angles such as degrees of between −/+65, −/+45, −/+25 and −/+21 substantially. These angles provide multiple applications as sufficiently orthogonal on to the radius of the inner surface within the tire mold halves. Besides, an excellent degree of cleaning is obtained after cleaning during quality controls getting grade "0" in cleanliness.

A preferred embodiment of the invention characterized in that movable head comprising horizontal rotatable joint pivoted to the support arm at a rotation axis parallel to the elongation plane in a freely movable manner. Thus, it gives rise to the possibility of application of dry ice extending orthogonally along a line the inner surface of half mold.

A preferred embodiment of the invention characterized in that the length of the lifting arms is smaller than the diameter of the basket. In this case, a lifting arm in closed position is turns to in a compact form by extending over the basket A preferred embodiment of the invention characterized in that the rotatable base carrying lifting arm and having the rotation axis orthogonal to rotation axis of the lifting arm inside of the basket. Thus, by turning of the lifting arm on the rotary platform, the free end of the lifting arm rotating peripherally at a vicinity of the inner surface of the half mold.

A preferred embodiment of the invention characterized in that the support arm is in a prolonged manner to the movement direction structured in telescopic form. In this case, elongation of the free end can be changed in accordance with tire curing mold in different diameters A preferred embodiment of the invention for driving the lifting arm comprising a manipulation arm pivoted on the support arm and spaced distantly to the rotatable joint which is placed on distal end of the lifting arm. Manipulation arm provides moving of support arm through the lifting arm. Furthermore, it prevents the opening of the support arm more than predetermined angle so that it prevents striking to the inner surface of the mold. A possible embodiment, the manipulation arm extends parallel to both ends of lifting arm. Thus, a compact structure is obtained despite the application over the lifting arm.

A preferred embodiment of the invention characterized in that a second joint placed between the proximal end and the basket in an elevating manner for the lifting arm and providing a movement to a motor.

DESCRIPTION OF THE FIGURES

The additional features and advantages of the invention are disclosed embodiments examples referenced in following drawings.

| REFERANCE NUMBERS | |
|---|---|
| 1 Carriage | 2 Foldable arm |
| 3 Pivot | 4 Half mold |
| 5 Interior part | 10 Basket |
| 11 Bottom | 12 Rotating base |
| 13 Platform | 14 Bearings |
| 15 Gap | 20 First motor |
| 21 Flange | 30 First pivot |
| 32 Motor | 33 Fastening element |
| 34 Joint | 35 Housing |
| 40 Second pivot | 42 Motor |
| 50 Lifting arm | 51 Opening |
| 52 Proximal end | 54 Distal end |
| 56 Body | 58 Rotary joint |
| 60 Manipulation arm | 62 Proximal part |
| 64 Distal part | 66 Rotary pivot |
| 70 Support arm | 71 Linkage |
| 72 Motor | 74 Sleeve 82 Nozzle |
| 76 Free end | 80 Movable head |
| 82 Nozzle | 83 Horizontal rotory joint |
| 84 Inlet | 86 Manipulator |
| 90 Orthogonal Rotary pivot | 91 Motor |
| 92 Adapter | A, B Movement direction |
| R1, R2, R3, R4, R5 Rotary Axis | |

DETAILED DESCRIPTION OF THE INVENTION

Figure 1:
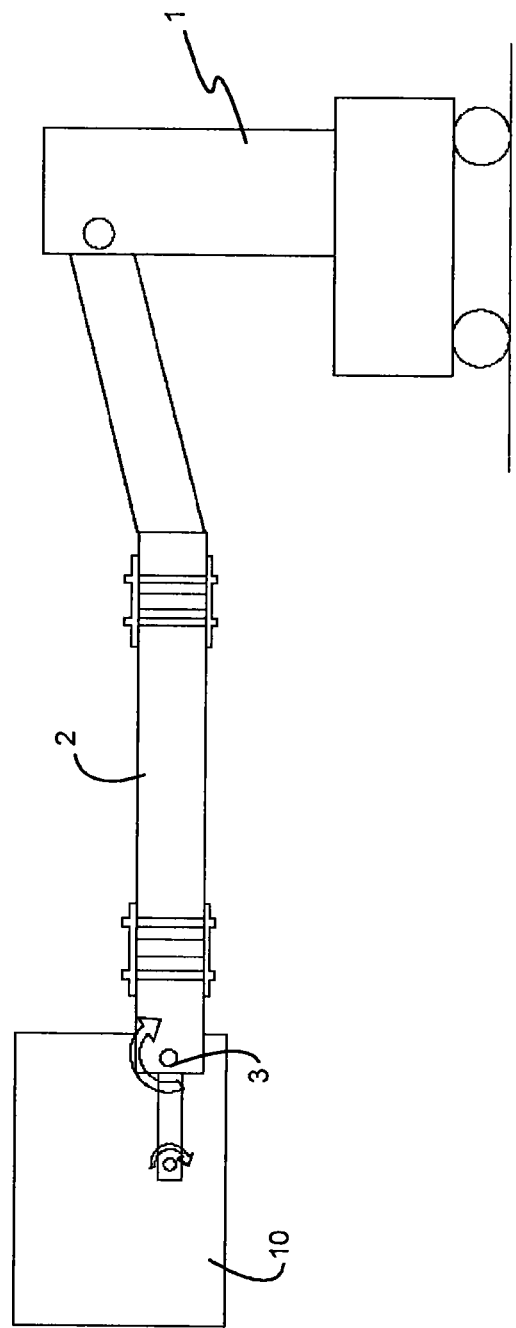
FIG. 1 is a schematic illustration from a side view of a vehicle for carrying the cleaning robot of the invention.

FIG. 1 shows a cleaning robot from a side view schematically for cleaning the curing tire mold comprising a basket (10) and a carriage (1) is carrying the basket (10). There is a folding arm (2) at the end of the carriage (1). The free end (3) of the folding arm (2) is mounted to the basket (10) via pivot (3).

Figure 2:
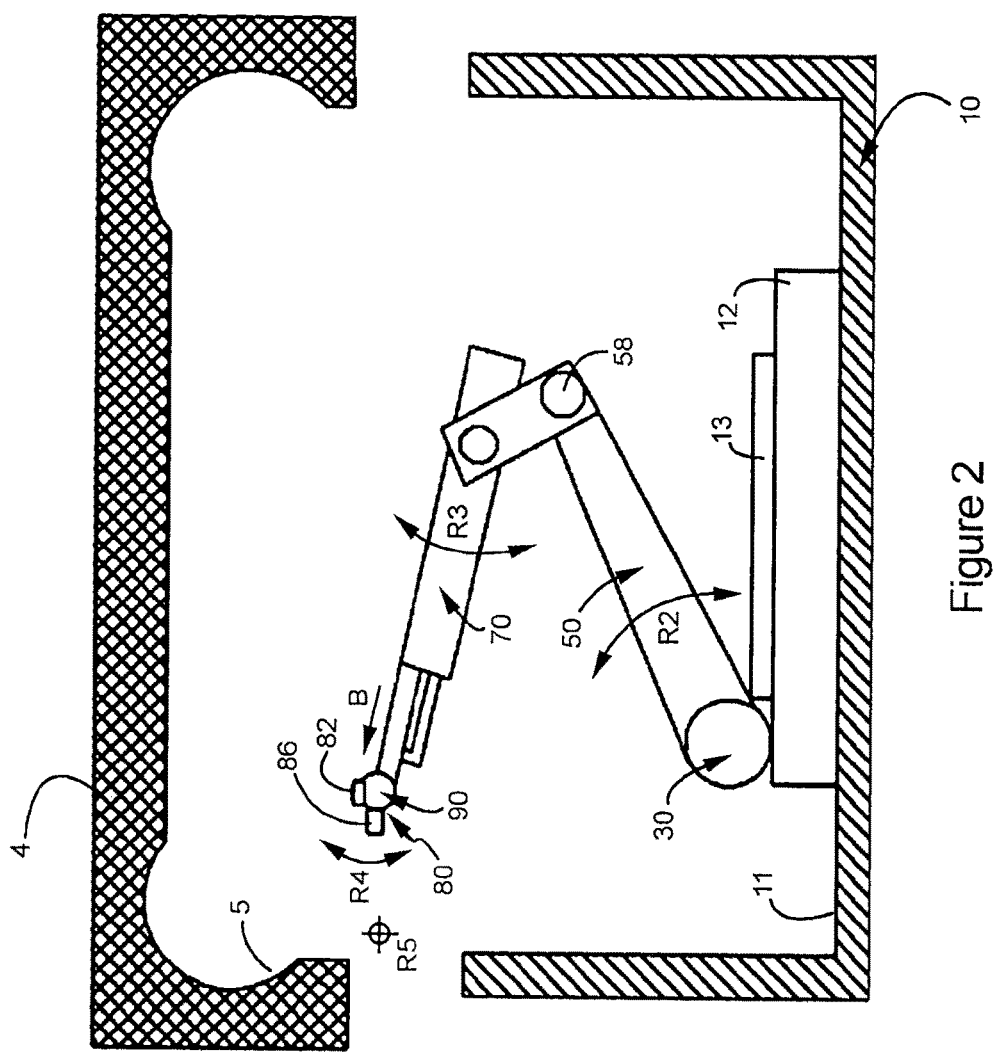
FIG. 2 is a schematic illustration from a side view of a representative embodiment of the cleaning robot of the invention.

Position of the basket (10) is shown under a half mold (4) which is one part of a tire curing mold halves in FIG. 2. Half mold (4) is such as having opening from bottom side of the half mold. The peripheral edges of the half mold (4) is combined with in a manner of connection on the frontal plane corresponding above the peripheral edges of the basket (10) as the basket (10) is elevated. Thus, the half-mold (4) and the basket (10) form a closed internal space together.

The cleaning robot is mounted on, at the bottom (11) of the basket (10) placed to a Rotating base (12) in a rotatable manner. Rotating base (12) and the basket (10) is concentric to each other. Also, the basket (10) and mold halves (4) are concentric to each other. Rotating base (12) is mounted on outer radial portion of a lifting arm (50) with a first pivot (30). Lifting arm (50), can be rotated on the axis of rotation (R2) such as the action of the pendulum over the first pivot (30). A support arm (70) is mounted to the free end of the lifting arm (50) with a rotary joint (58). A movable head (80) is mounted on the free end (76) the support arm (70) as telescopic formed with a rotary joint (90). There are a nozzle (82) on the movable head (80) and a manipulator (86) at the blowing direction thereof. Movable head (80) has a degree of freedom both up and down directions as well as right and left directions that is move suitable for the circumferential directions the inner surface (5) of the half-mold (4).

Figure 3:
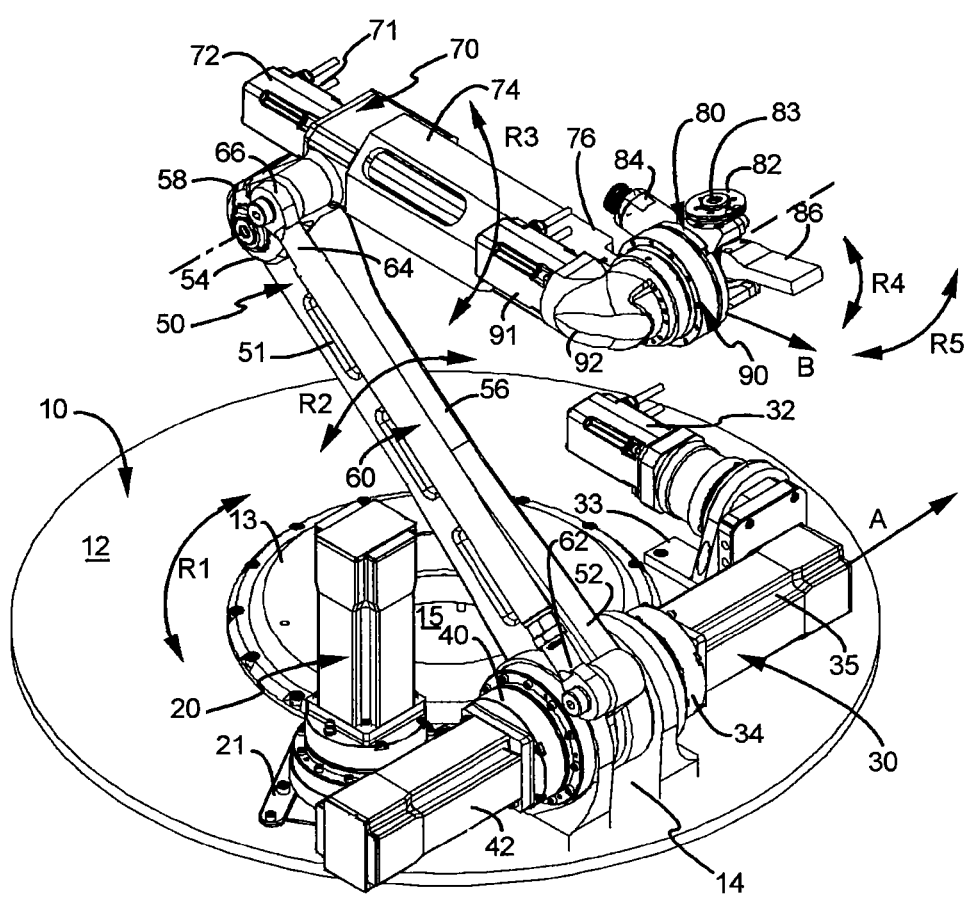
FIG. 3 is a schematic illustration from a side view of another representative embodiment of the cleaning robot of the invention.

Representative another embodiment of the cleaning robot is shown from perspective view in FIG. 3. Accordingly, Rotating base (12) formed as a circular plate that is located on the bottom (11) of the basket (10). There is a gap (15) at the center portion of the Rotating base (12) for the transition of cable and hose (not shown). There is an altitude in the form of a platform (13) around the gap (15). A bearing (14) is secured on the Rotating base (12) and at the outer part of the platform (13). A first motor (20) having a bearings structure in a prismatic is mounted extension rotates in the direction to the Rotating base (12) extends orthogonally to a Rotating base (12) via a flange (21). Rotating base (12) is revolved in an axis through the center of rotation with the help of a motor (20)

Lifting arm (50) is mounted on Rotating base (12) with the help of the first pivot (30) over the bearings (14). The first pivot (30) is a cylindrical pivot in the ring structure. The joint (34) of the first pivot (30) is rotated by a motor (32) with the help of the movement transmission device (not shown) inside the housing (35). Thus, lifting arm (50) associated with the joint (34) is lifted up from the distal end (54) thereof. A motor (32) of fastening member (33) is fastened on the Rotating base (12). A second pivot (40) is placed at the proximal end (52) of the lifting arm (50) in alignment with first pivot (30). The manipulation arm (60) formed in a spaced and extending parallel is fastened to the lifting arm (50) from one end to the second pivot (40) at the proximal end (62) thereof. Thus, it provides movement for support arm (70) on the rotary joint (58) of the lifting arm (50) via the rotary pivot (66) connected from the distal end (64) as well as it provides movement as to push forward manipulation arm (60) from the proximal end (62) by the movement of second pivot (40). A motor (42) provides movement to the second pivot (40) to achieve this. So, the free end (76) of support arm (70) can rotate at the pivot axis (R3) in a centered manner with rotary joint (58) to draw a bow.

The support arm (70) can be prolonged in telescopic form within a sleeve (74) with the help of motor (72) having an link (71) attached to a control device (not shown). A vertical Rotary pivot (90) is attached at the free end (76) the support arm (70). The vertical rotary joint (90) formed as a structure of bracket-like. A motor (91) arrives to the support arm (70) from one end thereof and from here it provides connection between the support arm (70) and movable head (80) by rotating radially to outward by means of an elbow-formed adapter (92).

Moving head (80) is placed at the free end (76) of an support arm (70). There is a nozzle (82) in front of an inlet (84) and behind the movable head (80) connected with a dry ice hose (not shown) providing fluid communication. In addition, there is a manipulator (86) as formed a tongue in line with the spraying position of the nozzle (82). Movable head (80) has capability of moves on rotary axis (R4) in the up-down direction over the inner surface (5) by means of vertical rotary pivot (90). On the other hand, movable head (80) can be operated to the right and left in the radial direction by means of a horizontal rotary joint (83). So, there is much more enforcement of the dry ice that is coming through the nozzle (82) to the area having thicker, dense and intensive pollution and dirtiness than according to the other areas, by moving the nozzle (82) back according to rotation direction (R1) of the Rotating base (12) at the inner part (5) of the mold.

In the present embodiment is dimensioned as fitting in to the basket (10) in the closed position the. Accordingly, lifting arm (50) stands on rotating base (12) when the closed position such as lays down from one end to the other side on rotating base (12). The length Lifting arm (50) is smaller than the inner diameter of the basket (10). Similarly, the support arm (70) is shorter than the lifting arm (50). Moveable head (80), effectuate a form like a L-shaped together with the support arm (70) by reaching out orthogonally it. However, the lifting arm (50) effectuate a form like a Z-shaped together with the rotating base (12) and support arm (70) in open position the and support arm (70) with reaches a form like. The moving head (80) direction of elongation is approximately parallel to the rotating base (12). The support arm (70) is extended or abbreviated in a manner telescopically for providing a closer position of the movable head (80) to the inner part (5) according to different half-molds (4). However, the proximity and the height of movable head (80) inside the inner part (5) is taken shape by adjusting angles of manipulation arm (60) with lifting arm (50) and with rotating base (12).

The manipulation arm (60) provides limited rotational movement for support arm (70) by rotating the support arm (70) with motor (32) on the rotating base (12) Length of the support arm (70) and length of the manipulation arm (60) are approximately equal size.

The screening capability as scanned angle range in the workspace of robot serial kinematics robot having links 5+1 jointed; and elongation capability as the approachable elongation amount for the linear axis, vary according to application surface in a preferred cleaning robot embodiment of the invention.

In the preferred cleaning robot embodiment of the present invention, there are first (1.) rotation axis (R1) operating preferably between 0.1 to 367 degrees, fifth (5.) rotation axis (R5) operating preferably 365 degrees same as fourth (4.) rotation axis (R4) especially for large wheel vehicles such as trucks having preferably elongation of 100 mm, second (2.) and third (3.) rotation axes (R3, R4) have an average maximum operating range of 120 degrees. The cleaning robot of the present invention in the preferred another embodiment, first (1.) rotation axis (R1) which is manipulating rotation of rotatable base (12) and operating preferably between −5 to +370 degrees, most preferably between 367 degrees and 0.1 degrees. Thus, cleaning robot of the present invention completes revolving peripheral at the point of path move on without missing any part of surface of mold. The cleaning robot of present invention comprises the rotation axis (R2) of second pivot (40) having angle range as preferably from 0 to 220 especially preferably from 0 to 190 degrees. The cleaning robot of present invention comprises the rotation axis (R3) connected with rotary joints (58, 66) having angle range as preferably from 0 to 220 especially preferably from 0 to 190 degrees. The cleaning robot of the present invention where elongation amount of support arm (70) through sleeve (74) in the movement direction (B) is preferably between 3 mm to 110 mm to 100 mm and most preferably 4.861 mm. The cleaning robot of the present invention comprises rotation axis (R4) of the vertical rotating pivot (90) having angle range as preferably from −30 to +370 degrees preferably in the range from −20 to +200 degrees and rotation axis (R5) of the horizontal rotating pivot (83) having angle range as preferably in the range of −25 to +25, most preferably −15-+15 degrees.

The invention claimed is:

1. A cleaning robot for cleaning inner surfaces of a half mold of tire curing molds, the cleaning robot being mounted inside a basket, the cleaning robot comprising a lifting arm rotatably associated with the basket at a proximal end of the lifting arm, the lifting arm being pivotably attached to a first end of a support arm at a distal end of the lifting arm, the lifting arm and the support arm fitting completely into the basket in a closed position and the cleaning robot comprising a movable head having a nozzle coupled in a manner to establish fluid communication to a dry ice inlet and located at a second end of the support arm, and a free end which is proximate an inner surface along a contour thereof with the cleaning robot in an open position;

wherein a horizontal rotatable joint is rotatably attached to the support arm at the second end providing freedom of movement horizontally at a rotation axis of the movable head orthogonal to an elongation axis of the support arm;

wherein the support arm extends in a telescoping manner.

2. The cleaning robot according to claim 1, wherein the orthogonal rotation axis of the horizontal rotatable joint is between substantially −20 and +20 degrees.

3. The cleaning robot according to claim 1, wherein the movable head comprises an orthogonal rotatable joint rotatably connected to the support arm at a rotation axis parallel to the elongation axis in a freely movable manner.

4. The cleaning robot according to claim 1, wherein a length of the lifting arm is smaller than a diameter of the basket.

5. The cleaning robot according to claim 1, further comprising a rotatable base operatively associated with a bottom of the basket carrying the lifting arm and having a rotation axis orthogonal to a rotation axis of the lifting arm inside of the basket.

6. The cleaning robot according to claim 1, further comprising a manipulation arm for driving the lifting arm pivotably attached to the support arm and spaced from a rotatable joint between the lifting arm and the support arm at a distal end of the lifting arm.

7. The cleaning robot according to claim 6, wherein the manipulation arm is extending parallel to both ends of the lifting arm.

8. The cleaning robot according to claim 1, wherein a second joint is between the proximal end and the basket in an elevating manner for the lifting arm and a motor for driving the lifting arm.

9. A cleaning robot for cleaning inner surfaces of a half mold of tire curing molds, the cleaning robot being mounted inside a basket, the cleaning robot comprising a lifting arm rotatably associated with the basket at a proximal end of the lifting arm, the lifting arm being pivotably attached to a first end of a support arm at a distal end of the lifting arm, the lifting arm and the support arm fitting completely into the basket in a closed position and the cleaning robot comprising a movable head having a nozzle coupled in a manner to establish fluid communication to a dry ice inlet and located at a second end of the support arm, and a free end which is proximate an inner surface along a contour thereof with the cleaning robot in an open position;
- a rotatable base operatively associated with a bottom of the basket carrying the lifting arm and having a rotation axis orthogonal to a rotation axis of the lifting arm inside of the basket;
- a first pivot rotatably associating the basket and the lifting arm, a second pivot rotatably associating a driving arm and the basket, a rotatable joint between the distal end of the lifting arm and the first end of the support arm, a rotary pivot between a distal end of the manipulation arm and the lifting arm, the horizontal rotatable joint is between the support arm and the movable head, an orthogonal rotatable joint between the support arm and the movable head wherein a rotational axis between the rotatable base and the basket operates between −5 to +370 degrees, the rotational axis of the second pivot of the cleaning robot operating between 0 to 220 degrees, the rotational axis related with the rotatable joint and the rotary pivot operating between 0 to −200 degrees, a telescoping movement distance of the support arm operating between 3 mm to 110 mm, rotary axis of the orthogonal rotatable joint operating between −30 to +370 degrees rotation axis of the horizontal rotatable joint operating between −25 to +25.

* * * * *